US009560331B2

(12) United States Patent
Nakai (10) Patent No.: US 9,560,331 B2
(45) Date of Patent: Jan. 31, 2017

(54) SIGNAL PROCESSING METHOD, SIGNAL PROCESSING SYSTEM AND DISPLAY DEVICE (71) Applicant: BOE TECHNOLOGY GROUP CO., LTD., Beijing (CN)

(72) Inventor: Tadashi Nakai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/600,654

(22) Filed: Jan. 20, 2015

(65) Prior Publication Data
US 2015/0350619 A1    Dec. 3, 2015

(30) Foreign Application Priority Data

May 30, 2014    (CN) .......................... 2014 1 0241104

(51) Int. Cl.
H04N 9/64    (2006.01)
H04N 9/31    (2006.01)
G09G 3/36    (2006.01)

(52) U.S. Cl.
CPC ............... H04N 9/646 (2013.01); G09G 3/36 (2013.01); H04N 9/3179 (2013.01)

(58) Field of Classification Search
None
See application file for complete search history.

(56) References Cited

U.S. PATENT DOCUMENTS 4,984,081 A * 1/1991 Miyoshi ............... H04N 7/0122
                                                             348/445
7,139,022 B1 * 11/2006 Raffy ..................... H04N 9/045
                                                             345/604

(Continued)

FOREIGN PATENT DOCUMENTS

CN              1744723 A       3/2006
CN            103124337 A       5/2013

(Continued)

OTHER PUBLICATIONS

Chinese Patent Application No. 201410241104.1, Office Action dated Jul. 28, 2015, eight (8) pages, English Translation, ten (10) pages.

(Continued)

Primary Examiner — Michael Teitelbaum
(74) Attorney, Agent, or Firm — Nath, Goldberg & Meyer; Joshua B. Goldberg (57) ABSTRACT The present invention provides a signal processing method comprising steps of: S1, obtaining an image signal of an original image; and S2, enhancing the image signal of the original image, so as to obtain an image signal of a final image having a pixel resolution no less than that of the original image, wherein, a pixel resolution of the original image is any one pixel resolution selected from a plurality of different pixel resolutions. The present invention further provides a signal processing system and a display device. By using the signal processing method of the present invention, input and processing of images with high resolution can be realized. Moreover, when the original image has a lower pixel resolution, the image signal of a final image with a higher pixel resolution can be obtained based on the signal processing method of the present invention.

9 Claims, 8 Drawing Sheets (56) References Cited

U.S. PATENT DOCUMENTS

| | | | |
|---|---|---|---|
| 2003/0146885 A1* | 8/2003 | Hoppenbrouwers | ........................ G09G 3/2022 345/60 |
| 2004/0012606 A1* | 1/2004 | Gim | ................. G09G 5/02 345/589 |
| 2011/0037784 A1 | 2/2011 | Shiomi | |
| 2011/0205428 A1 | 8/2011 | Yamashita | |
| 2014/0307165 A1* | 10/2014 | Chiba | .............. H04N 21/43635 348/441 |
| 2015/0296175 A1* | 10/2015 | Wallace | ............... H04N 7/0125 348/445 |

FOREIGN PATENT DOCUMENTS

| | | |
|---|---|---|
| EP | 1669968 A2 | 6/2006 |
| WO | 2013003698 A2 | 1/2013 |

OTHER PUBLICATIONS

European Search Report for counterpart European Application No. 15155973.9, issued Oct. 26, 2015.

\* cited by examiner

Fig. 1

Width

Fig. 2

Width

Fig. 3

Width

SIGNAL PROCESSING METHOD, SIGNAL PROCESSING SYSTEM AND DISPLAY DEVICE

FIELD OF THE INVENTION

The present invention relates to the field of display device, in particular to a signal processing method for performing signal processing on the display signal input to the display device, a signal processing system for performing the signal processing method, and a display device comprising the signal processing system.

BACKGROUND OF THE INVENTION

With the increasing demands of users for the display devices, those display devices having high pixel resolution have been developed. For example, some UHD TV (Ultra High Definition Television) has a pixel resolution of up to 8k4k (i.e. 7680×4320).

The pixel resolution of the display device is increased, and the definition of the video/image input to the display device is increased accordingly, therefore a huge video information amount is generated. However, there is no an existing generic system for driving the 8k4k liquid crystal display yet.

Thus a technical problem to be solved in the art is how to process the signal input to the 8k4k liquid crystal display.

SUMMARY OF THE INVENTION

An object of the present invention is to provide a signal processing method for performing signal processing on the display signal input to a display device, a signal processing system for performing the signal processing method, and a display device comprising the signal processing system. The signal processing method can process an original image input to an 8k4k liquid crystal display panel.

To achieve the above object, as one aspect of the present invention, there is provided a signal processing method comprising steps of:

S1, obtaining an image signal of an original image; and

S2, enhancing the image signal of the original image, so as to obtain an image signal of a final image having a pixel resolution no less than that of the original image, wherein, a pixel resolution of the original image is any one pixel resolution selected from a plurality of different pixel resolutions.

Preferably, the pixel resolution of the original image is any one of 1920×1080, 3840×2160 and 7680×4320, and the pixel resolution of the final image is 7680×4320.

Preferably, the step S2 comprises steps of:

S21, converting the image signal of the original image from an RGB signal into an intermediate YUV signal;

S22, performing an edge enhancement on a Y signal of the intermediate YUV signal, adjusting any one of color levels, black and white levels, and hues of a U signal and a V signal of the intermediate YUV signal respectively, so as to obtain an enhanced intermediate YUV signal; and S23, converting the enhanced intermediate YUV signal into an intermediate RGB signal, so that the final image is displayed based on the intermediate RGB signal.

Preferably, the step S2 further comprises a step of:

S24, performing a brightness level adjustment and/or a gamma adjustment on the intermediate RGB signal obtained in the Step S23, so as to obtain an RGB signal of the final image.

Preferably, the pixel resolution of the original image is lower than the pixel resolution of the final image, the step S21 comprises steps of:

S21a, converting the image signal of the original image from the RGB signal into a YUV signal of the original image; and S21b, scaling-up the YUV signal of the original image, so as to obtain the intermediate YUV signal.

Preferably, the step S21a comprises steps of:

S211a, dividing the original image into n sub-images uniformly; and

S211b, converting the image signals of the n sub-images from the RGB signals into YUV signals;

in the step S21b, the YUV signal of each sub-image is scaled-up to obtain an intermediate YUV signal corresponding to each of the scaled-up sub-images, each intermediate YUV signal corresponds to a sub-image having a same pixel resolution, and the final image with a pixel resolution of M×N is formed by combination of the n sub-images.

Preferably, n is 16, M is 7680, and N is 4320.

Preferably, the signal processing method further comprises a step of:

S3, performing a display mode adjustment on the final image.

Preferably, the signal processing method further comprises a step of:

S4, generating a backlight adjustment signal in accordance with a desired display mode.

Preferably, the pixel resolution of the original image is 3840×2160, an input frequency of the original image is 24 Hz or 30 Hz, the signal processing method further comprises the following step between the steps S1 and S2:

converting an output frequency of the original image into 60 Hz.

Preferably, the signal processing method further comprises a step of:

S5, converting the image signal of the final image into an image signal having a scanning order.

As another aspect of the present invention, there is provided a signal processing system comprising:

an original image acquiring module for acquiring an image signal of an original image;

a signal enhancement module for enhancing the image signal of the original image, so as to obtain an image signal of a final image having a pixel resolution no less than that of the original image, wherein, the original image acquiring module includes a plurality of image receiving ports, and the plurality of image receiving ports are respectively configured for acquiring an original image with different pixel resolutions.

Preferably, the plurality of image receiving ports include a LVDS receiving port and two DVI receiving ports, the LVDS receiving port is configured for acquiring an original image with a pixel resolution of 1920×1080, the two DVI receiving ports are configured for acquiring respectively an original image with a pixel resolution of 3840×2160 and an original image with a pixel resolution of 7680×4320.

Preferably, the signal enhancement module comprises:

a first signal converting unit for converting an image signal of the original image from an RGB signal into an intermediate YUV signal;

a signal enhancement unit for performing an edge enhancement on a Y signal of the intermediate YUV signal, and adjusting any one of color levels, black and white levels, and hues of a U signal and a V signal of the intermediate YUV signal respectively, so as to obtain an enhanced intermediate YUV signal; and a second signal converting unit for converting the enhanced intermediate YUV signal into an intermediate RGB signal, so that the final image is displayed based on the intermediate RGB signal.

Preferably, the signal enhancement unit is further configured for performing a brightness level adjustment and/or a gamma adjustment on the intermediate RGB signal, so as to obtain an RGB signal of the final image.

Preferably, the first signal converting unit comprises:

a signal converting subunit for converting the image signal of the original image from the RGB signal into a YUV signal of the original image; and a signal scaling-up subunit for scaling-up the YUV signal of the original image, so as to obtain the intermediate YUV signal.

Preferably, the signal converting subunit is configured for dividing the original image into n sub-images uniformly, and converting the image signals of the n sub-images from the RGB signals into YUV signals; the signal scaling-up subunit is configured for scaling-up the YUV signal of each sub-image to obtain an intermediate YUV signal corresponding to each of the scaled-up sub-images, each intermediate YUV signal corresponds to a sub-image having a same pixel resolution, and the final image with a pixel resolution of M×N is formed by combination of the n sub-images.

Preferably, n is 16, M is 7680, and N is 4320.

Preferably, the signal processing system further comprises:

a mode adjustment module for performing a display mode adjustment on the final image.

Preferably, the signal processing system further comprises:

a backlight adjustment module for generating a backlight adjustment signal in accordance with a desired display mode.

Preferably, the signal enhancement module further comprises:

a frame frequency converting unit for converting an output frequency of the original image into 60 Hz.

Preferably, the signal processing system further comprises a scanning signal generation module for converting the image signal of the final image into an image signal having a scanning order.

Preferably, the signal processing system further comprises an excitation signal acquiring module for receiving an excitation signal, the image acquiring module start acquiring the original image when the excitation signal is acquired by the excitation signal acquiring module.

As another aspect of the present invention, there is provided a display device comprising a signal input device, a signal processing system and a display panel, wherein the signal processing system is the above signal processing system provided by the present invention, and the signal input device is used for providing the original image to the signal processing system.

Preferably, the display panel has a pixel resolution of 7680×4320.

The signal processing method according to the present invention can be applied to input an image with a high resolution. By providing the image signal of the final image obtained according to the signal processing method of the present invention to the display panel, a final image with better display effect can be obtained. Moreover, when the original image has a lower pixel resolution, the image signal of a final image with a higher pixel resolution can be obtained based on the signal processing method of the present invention.

BRIEF DESCRIPTION OF THE DRAWINGS

The drawings which constitute a part of the specification are used to provide further understanding of the present invention, and are used to illustrate the present invention in conjunction with the following embodiments, but shall not be construed as limitation to the present invention. In the drawings.

| Description of Reference Numerals | |
|---|---|
| 100: signal input device | 110: HDMI |
| 120: LVDS output port | 130: DVI output port |
| 200: signal processing system | 210: first logic gate array |
| 211, 221: DVI receiving port | 212: LVDS receiving port |
| 213: frame frequency conversion unit | 220: second logic gate array |
| 230: third logic gate array | 231: signal scaling-up subunit |
| 232: signal conversion subunit | 240: fourth logic gate array |
| 241: signal enhancement unit | 242: mode adjustment module |
| 243: backlight adjustment module | 244: scanning signal generation module |
| 300: display panel | 310: LED driving circuit |

DETAILED DESCRIPTION OF THE EMBODIMENTS

Hereinafter, the embodiments of the present invention will be described in details in conjunction with the accompanying drawings. It should be understood that the embodiments described herein are only intended to illustrate and explain the present invention, rather than limiting the present invention.

Figure 1:
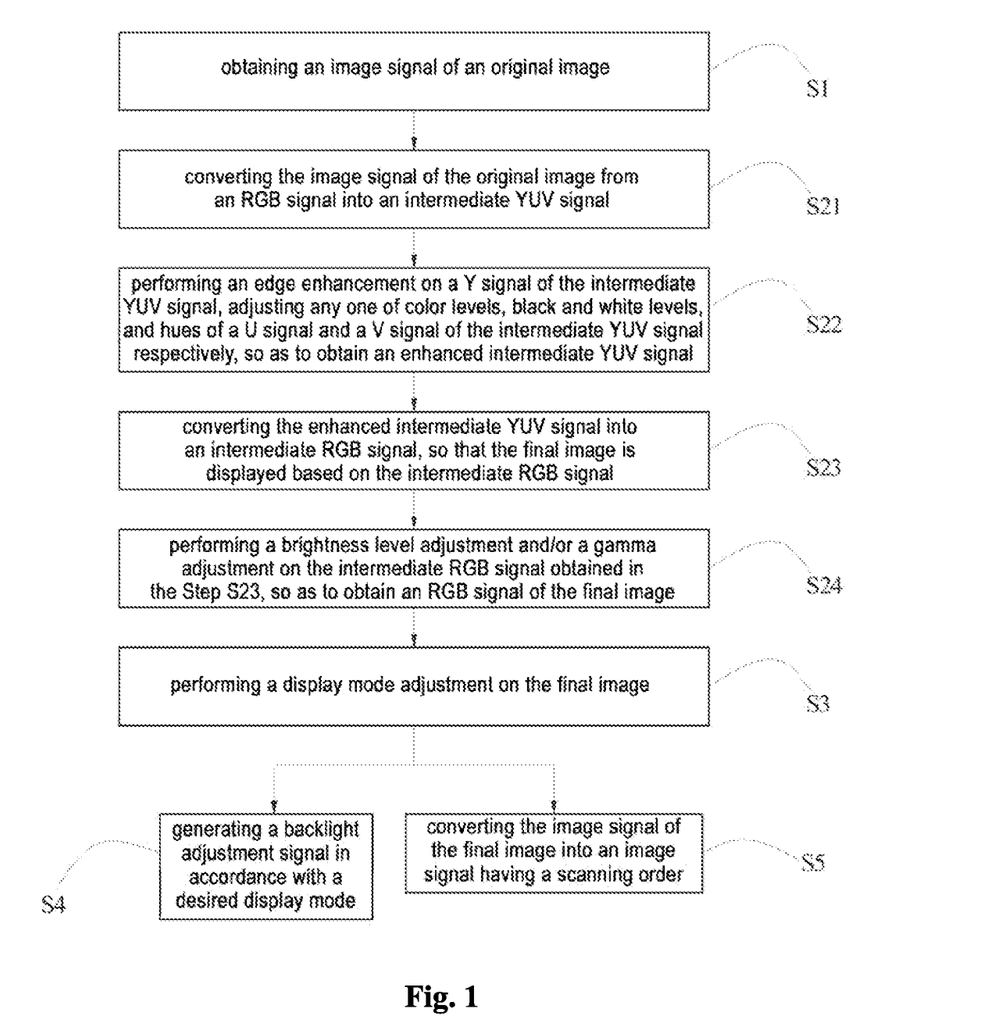
FIG. 1 is a schematic flowchart of the signal processing method provided by the present invention.

As shown in FIG. 1, as one aspect of the present invention, there is provided a signal processing method comprising:

S1, obtaining an image signal of an original image;

S2, enhancing the image signal of the original image, so as to obtain an image signal of a final image having a pixel resolution no less than that of the original image, wherein, the pixel resolution of the original image is any one pixel resolution selected from a plurality of different pixel resolutions.

It is readily understood that the step S2 implements a step of adjusting the image quality of an original image.

By providing the image signal of the final image obtained according to the method of the present invention into a display panel, a final image with better display effect can be obtained (e.g., the displayed final image is more clear and has more vivid colors).

Further, when the original image has a lower pixel resolution, by using the signal processing method of the present invention, the image signal of the final image having a higher pixel resolution can be obtained.

For example, when the original image has a pixel resolution of 1920×1080, after step S2, the image signal of the final image having a pixel resolution of 7680×4320 can be obtained. That is, based on the input original image with a lower pixel resolution, a final image having a higher pixel resolution can be displayed on the display panel.

Besides, in the signal processing method of the present invention, the pixel resolution of the original image is any one pixel resolution selected from a plurality of different pixel resolutions. That is, the signal processing method of the present invention can be utilized to process the image signal of the original image with the plurality of different pixel resolutions, thus the application scope of the signal processing method of the present invention is extended.

As one implementation of the present invention, the pixel resolution of the original image may be any one of 1920×1080, 3840×2160 and 7680×4320, that is, the signal processing method of the present invention can process an original image with at least 3 different pixel resolutions.

Specifically, the method of the present invention is applicable to the following cases: the pixel resolution of the original image is 1920×1080, and the pixel resolution of a final image is 7680×4320; the pixel resolution of the original image is 3840×2160, and the pixel resolution of the final image is 7680×4320; and the pixel resolution of the original image is 7680×4320.

Hereinafter, the enhancement processing performed on the image signal of the original image will be described in detail. Specifically, the step S2 may comprise the following steps:

S21, converting the image signal of the original image from the RGB signal into an intermediate YUV signal;

S22, performing edge enhancement on the Y signal of the intermediate YUV signal, adjusting any one of color levels, black and white levels, and hues of the U signal and V signal of the intermediate YUV signal respectively, so as to obtain an enhanced intermediate YUV signal;

S23, converting the enhanced intermediate YUV signal into an intermediate RGB signal, so that the final image is displayed based on the intermediate RGB signal.

Note that said "the final image is displayed based on the intermediate RGB signal" includes two cases, the first case is that the intermediate RGB signal is the RGB signal of the final image; and the second case is that the intermediate RGB signal is not the RGB signal of the final image, and the intermediate RGB signal shall be subjected to further processing so as to obtain the RGB signal of the final image.

In the second case, the step S2 further comprises the following step:

S24, performing a brightness level adjustment and/or a gamma adjustment on the intermediate RGB signal obtained in Step S23, so as to obtain the RGB signal of the final image.

When the pixel resolution of the original image is lower than the pixel resolution of the final image (for example, the pixel resolution of the original image is 1920×1080 or 3840×2160, and the pixel resolution of the final image is 7680×4320), the step S21 comprises the following steps:

S21a, converting the image signal of the original image from the RGB signal into a YUV signal of the original image;

S21b, scaling-up the YUV signal of the original image, so as to obtain the intermediate YUV signal.

Figure 7:
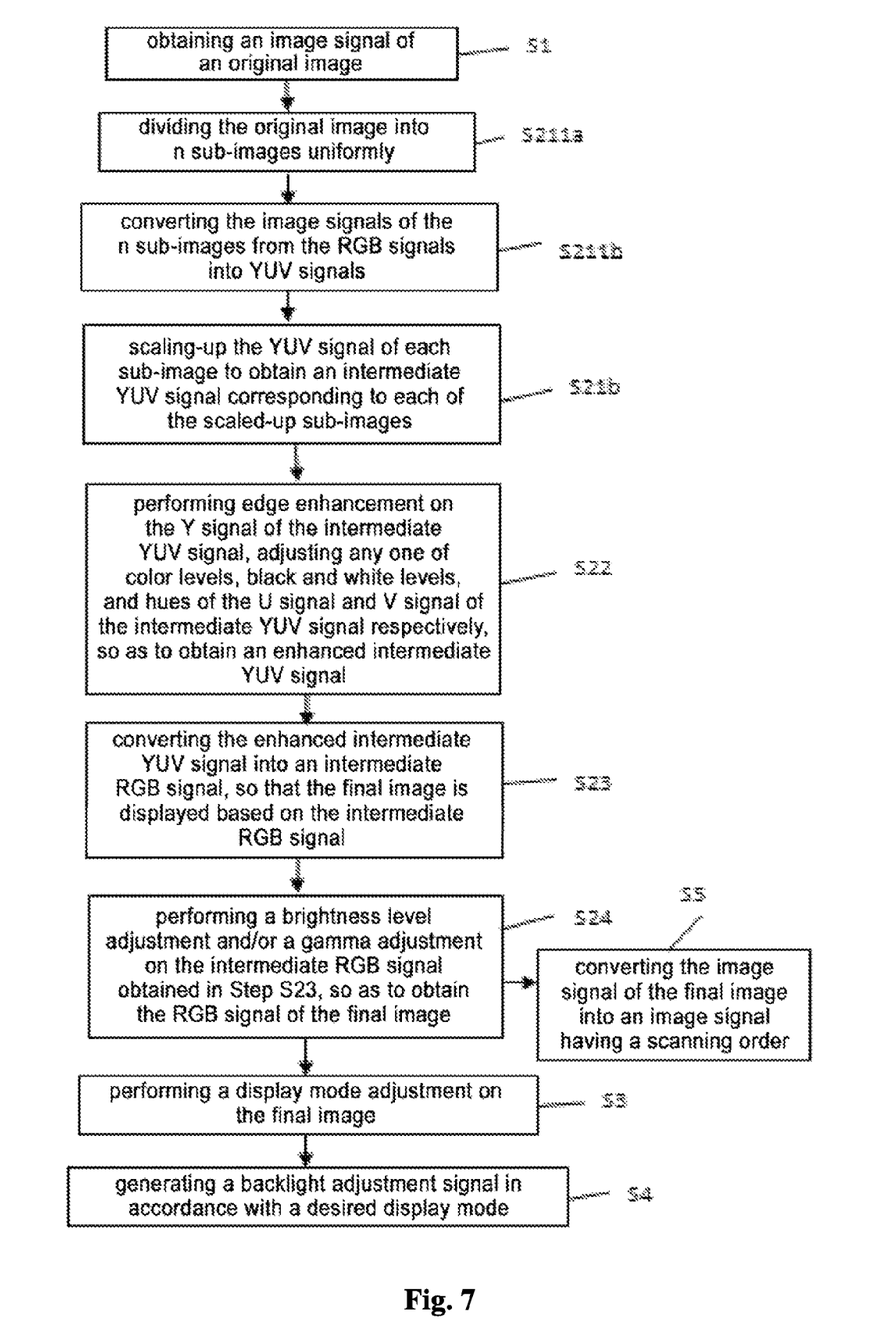
FIG. 7 is a flowchart of the signal processing method provided by the present invention when processing the original image having a pixel resolution of 4k2k or 2k1k.

To facilitate processing, as shown in FIG. 7, the step S21a preferably comprises:

S211a, dividing the original image into n sub-images uniformly;

S211b, converting the image signals of the n sub-images from the RGB signals into YUV signals;

in the step S21b, the YUV signal of each sub-image is scaled-up to obtain an intermediate YUV signal corresponding to each of the scaled-up sub-image, each intermediate YUV signal corresponds to a sub-image having the same pixel resolution, and the final image with a pixel resolution of M×N is formed by combination of the n sub-images.

As above, the pixel resolution of the final image is M×N. Those skilled in the art should know that the pixel resolution of the final image is the resolution that can be achieved by the display device. For example, M×N may be 3840×2160, or M×N may be 7680×4320.

Specifically, when the pixel resolution of the final image is 7680×4320, in the step S21, the image corresponding to the intermediate YUV signal includes 16 sub-images having a pixel resolution of 480×4320. The combination of the 16 sub-images forms the final image.

When the pixel resolution of the acquired original image is 7680×4320, the image signal of the original image does not need to be scaled-up, but only needs to be subjected to the step S2 to be enhanced, so as to obtain the image signal of the final image.

In order to provide more vivid color for the image displayed on a display panel, preferably, the step S2 further comprises the following step: S24, performing a brightness level adjustment and/or a gamma adjustment on the RGB signal obtained in Step S23.

By inputting the RGB signal of the final image obtained in Step S24 into the display panel, the displayed image is more clear than the original image and has more vivid color, so that a better visual experience can be brought to a user.

For providing a display mode desired by the user, preferably the signal processing method further comprises the following step: S3, performing a display mode adjustment on the final image. After the step S3, an image can be displayed on the display panel in a mode desired by the user (such as a theater mode, a concert mode and the like).

To achieve a corresponding display mode, preferably the signal processing method further comprises the following step: S4, generating a backlight adjustment signal in accordance with the desired display mode. The backlight adjustment signal is transmitted to the LED driving circuit of a backlight, so as to control the brightness of LED in the backlight.

In the present invention, the output frequency of the final image may be 60 Hz. In the existing video signal, when the pixel resolution of each frame of the original image is 3840×2160, the frequency of inputting the original image may be 24 Hz or 30 Hz. In order to achieve the final outputting frequency of 60 Hz, preferably, the signal processing method further comprises the following step between the steps S1 and S2: converting the output frequency of the original image into 60 Hz.

When the inputting frequency of the original image is 24 Hz, the original image can be repeatedly output with a factor of 1:2.5, so as to convert the output frequency of the original image into 60 Hz. For example, when the input original image is ABCD, the output image signal after frequency conversion is AABBBCCDDD.

When the inputting frequency of the original image is 30 Hz, the original image can be repeatedly output with a factor of 1:2, so as to convert the output frequency of the original image into 60 Hz. For example, when the input original image is ABCD, the output image signal after frequency conversion is AABBCCDD.

After the image signal of the final image is obtained, the image signal of the final image is output to the display panel, therefore the signal processing method further comprises the following step: S5, converting the image signal of the final image into the image signal having a scanning order.

Figure 11:
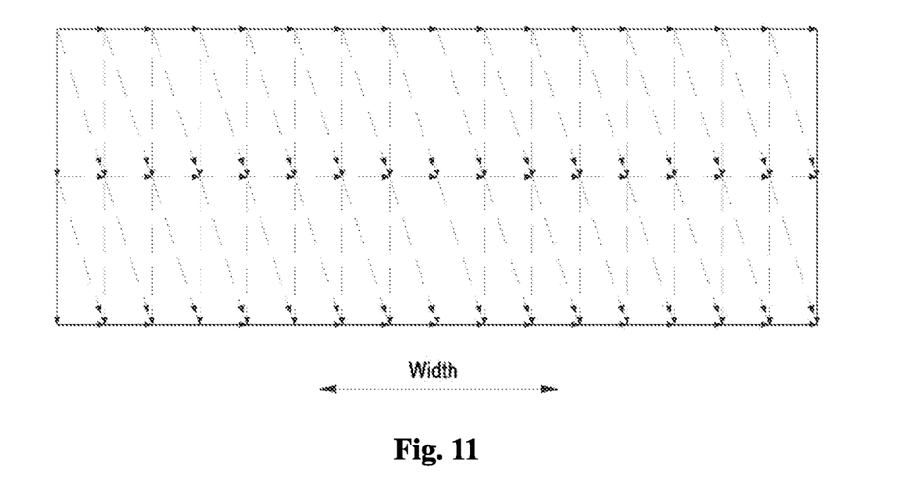
FIG. 11 is a schematic view of one scanning manner in the signal processing method provided by the present invention.
Figure 12:
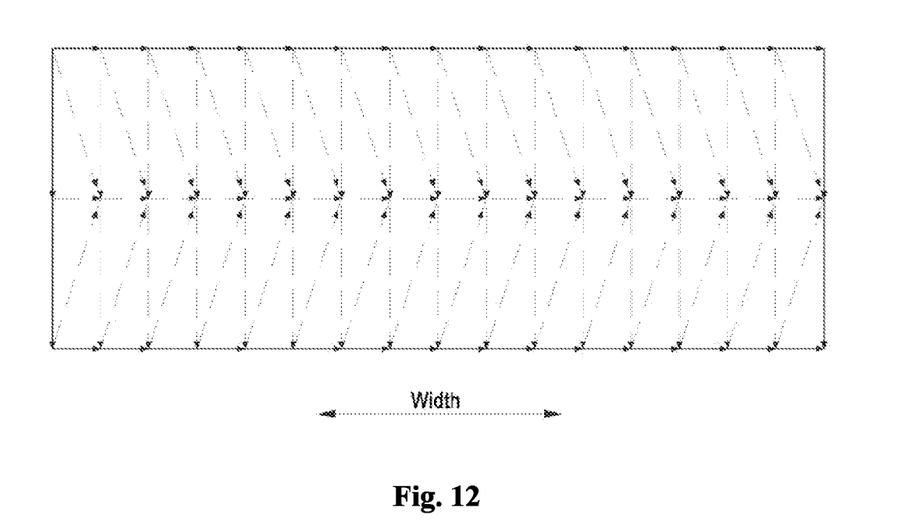
FIG. 12 is a schematic view of another scanning manner in the signal processing method provided by the present invention.

In the present invention, the scanning order for the final image signal is not specifically limited, a scanning from top to bottom as shown in FIG. 11, a scanning from two ends to the middle as shown in FIG. 12, and the like can be adopted.

In order to control the signal processing method, preferably, the signal processing method further comprises the following step prior to the step S1: acquiring an excitation signal. The signal processing method proceeds to the step S1 after acquiring the excitation signal. If no excitation signal is acquired, the signal processing method does not proceed to the step S1 until the excitation signal is acquired. The excitation signal may be provided by a signal input device, which will be described in the following.

As another aspect of the present invention, there is provided a signal processing system for performing the above signal processing method, the signal processing system comprising:

an original image acquiring module (to perform the step S1) for acquiring an image signal of an original image; and a signal enhancement module (to perform the step S2) for enhancing the image signal of the original image, so as to obtain an image signal of a final image having a pixel resolution no less than that of the original image, wherein, the original image acquiring module includes a plurality of image receiving ports, and the plurality of image receiving ports are respectively configured for acquiring the original image with different pixel resolutions.

The advantages of the signal processing method according to the present invention have been described in detail and are not repeated here.

Besides the advantage of performing the signal processing method, the signal processing system of the present invention still has the following advantages: the signal processing system of the present invention is capable of performing signal processing on original images with different pixel resolutions, therefore the signal processing system of the present invention has better versatility and has reduced limitation to the original image.

In the present invention, a plurality of receiving ports can be provided. When the pixel resolution of the original image is high, the original image can be divided into a plurality of parts, and the plurality of parts of the original image can be received respectively by the plurality of receiving ports.

Figure 8:
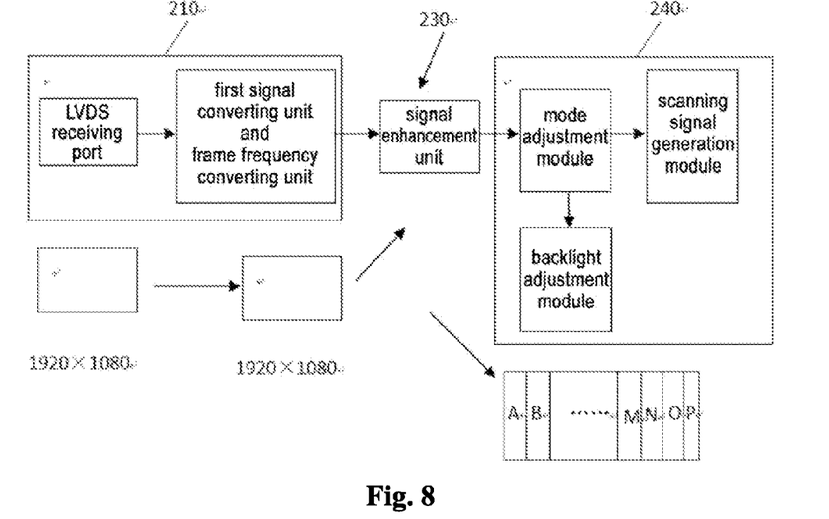
FIG. 8 is a flowchart of the signal processing system provided by the present invention when processing the original image having a pixel resolution of 2k1k.
Figure 9:
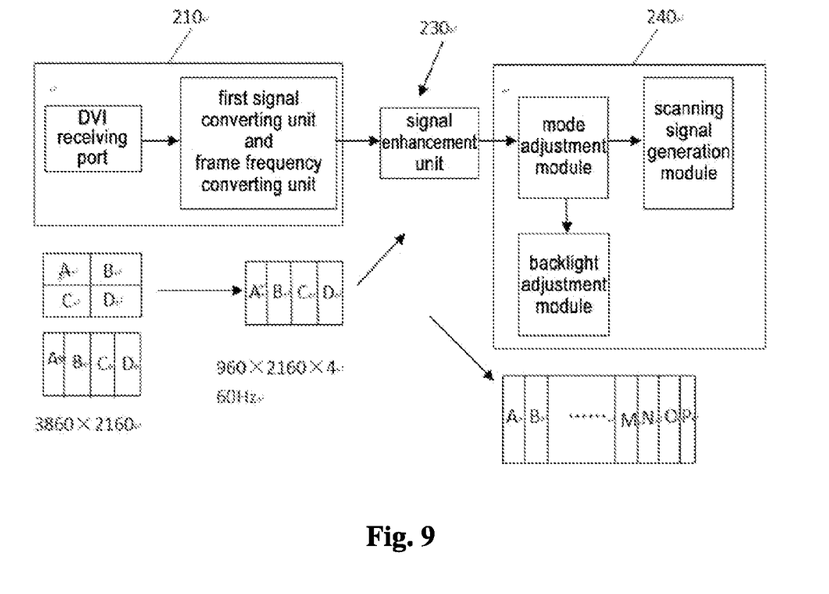
FIG. 9 is a flowchart of the signal processing system provided by the present invention when processing the original image having a pixel resolution of 4k2k.

As an implementation of the present invention, the plurality of image receiving ports may include an LVDS receiving port and two DVI receiving ports. The LVDS receiving port is configured for acquiring the original image with a pixel resolution of 1920×1080, and the two DVI receiving ports are configured for acquiring respectively the original image with a pixel resolution of 3840×2160 and the original image with a pixel resolution of 7680×4320. FIG. 8 shows the schematic flowchart of the signal processing system provided by the present invention when processing the original image having a pixel resolution of 1920×1080; FIG. 9 shows the schematic flowchart of the signal processing system provided by the present invention when processing the original image having a pixel resolution of 3840×2160.

Figure 10:
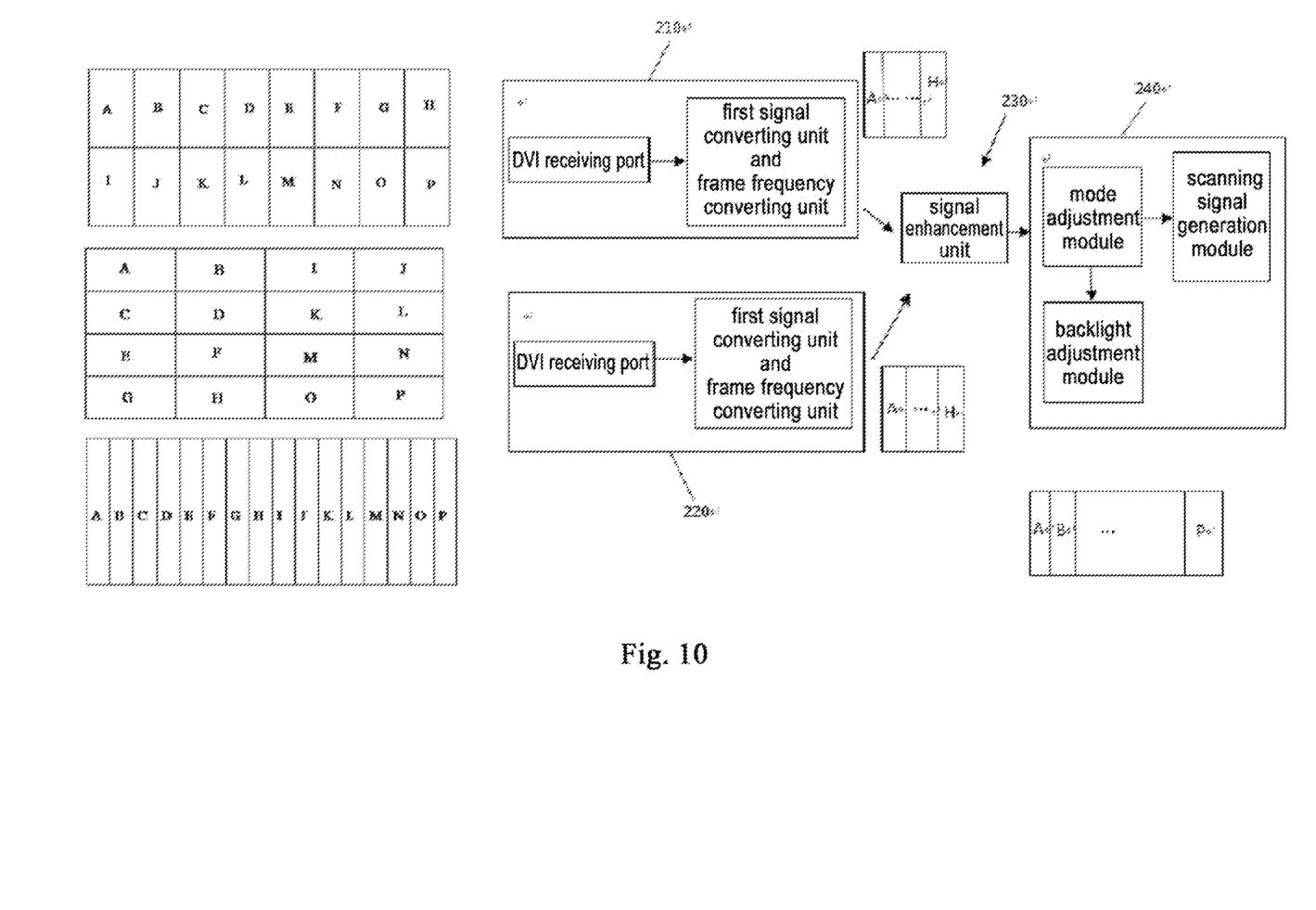
FIG. 10 is a flowchart of the signal processing system provided by the present invention when processing the original image having a pixel resolution of 8k4k.

When the input original image has a pixel resolution of 7680×4320, the original image can be divided into two parts and input to the signal processing system through two DVI receiving ports respectively. For example, when the original image is divided into 16 sub-images (a sub-image A to a sub-image P) in the manner shown in FIG. 2, the sub-images A to H can be input to the signal processing system through one DVI receiving port, while the sub-images I to P can be input to the signal processing system through another DVI receiving port (as shown in FIG. 10). When the plurality of sub-images is output, those sub-images are combined to provide a complete image.

Preferably, the signal enhancement module comprises:

a first signal converting unit (to perform the step S21) for converting the image signal of the original image from the RGB signal into an intermediate YUV signal;

a signal enhancement unit (to perform the step S22) for performing edge enhancement on the Y signal of the intermediate YUV signal, and adjusting any one of color levels, black and white levels, and hues of the U signal and V signal of the intermediate YUV signal respectively, so as to obtain an enhanced intermediate YUV signal; and a second signal converting unit (to perform the step S23) for converting the enhanced intermediate YUV signal into an intermediate RGB signal, the final image is displayed based on the intermediate RGB signal.

In order to perform step S24, preferably, the signal enhancement unit is further configured for performing a brightness level adjustment and/or a gamma adjustment on the intermediate RGB signal, so as to obtain the RGB signal of the final image.

Preferably, the first signal converting unit comprises:

a signal converting subunit (to perform the step S21a) for converting the image signal of the original image from the RGB signal into a YUV signal of the original image;

a signal scaling-up subunit (to perform the step S21b) for scaling-up the YUV signal of the original image, so as to obtain the intermediate YUV signal.

Preferably, the signal converting subunit is configured for dividing the original image into n sub-images uniformly, and converting the image signals of the n sub-images from the RGB signals into YUV signals; the signal scaling-up subunit is configured for scaling-up the YUV signal of each sub-image to obtain an intermediate YUV signal corresponding to each of the scaled-up sub-images, each intermediate YUV signal corresponds to a sub-image having the same pixel resolution, and the final image with a pixel resolution of M×N is formed by combination of the n sub-images.

In order to perform the step S3, preferably, the signal processing system further comprises: a mode adjustment module 242 for performing a display mode adjustment on the final image.

In order to perform the step S4, preferably, the signal processing system further comprises: a backlight adjustment module 243 for generating a backlight adjustment signal in accordance with the desired display mode. It should be noted that, the backlight adjustment module 243 is connected with the LED driving circuit in the backlight of the display panel, and provides the backlight adjustment signal to the LED driving circuit.

In order to perform the step of "converting the output frequency of the original image into 60 Hz" between the steps S1 and S2, preferably, the signal processing system may further comprise:

a frame frequency converting unit for converting the output frequency of the original image into 60 Hz.

As discussed above, the operating principle of the frame frequency converting unit is as follows:

When the inputting frequency of the original image is 24 Hz, the original image can be repeatedly output by the frame frequency converting unit with a factor of 1:2.5, so as to convert the output frequency of the original image into 60 Hz. For example, when the input original image is ABCD, the output image signal after frequency conversion is AABBBCCDDD.

When the inputting frequency of the original image is 30 Hz, the original image can be repeatedly output by frame frequency converting unit with a factor of 1:2, so as to convert the output frequency of the original image into 60 Hz. For example, when the input original image is ABCD, the output image signal after frequency conversion is AABBCCDD.

In order to perform the step S5, preferably, the signal processing system further comprises a scanning signal generation module 244 for converting the image signal of the final image into the image signal having a scanning order.

The signal processing system may further comprise an excitation signal acquiring module for receiving an excitation signal, the image acquiring module start acquiring the original image when the excitation signal is acquired by the excitation signal acquiring module.

In the present invention, the signal processing system may include four programmable gate array (FPGA), in particular, as shown in the figures, the signal processing system may include a first programmable gate array 210, a second programmable gate array 220, a third programmable gate array 230, and a fourth programmable gate array 240.

In the first programmable gate array 210, a DVI receiving port 211, a LVDS receiving port 212 and a frame frequency converting unit 213 are integrated. Thus, the first programmable gate array 210 can use the LVDS receiving port 212 to receive the original image with a pixel resolution of 1920×1080, and use the DVI receiving port 211 to receive the original image with a pixel resolution of 3840×2160. In addition, the first programmable gate array 210 can also use the frame frequency converting unit 213 to convert the input frequency of the original image into a desired frequency (e.g., from 24 Hz or 30 Hz to 60 Hz). The first programmable gate array may also be provided with a memory controller, a DDR3, a register and other components, the configurations and functions of these components are known in the art, and are not repeated here.

The second programmable gate array 220 can use a DVI receiving port 221 to receive an original image with a pixel resolution of 3840×2160, and can use a frame frequency converting unit 222 to convert the input frequency of the original image into desired frequency. The second programmable gate array 220 may also be provided with a memory controller, a DDR3, a register and other components, the configurations and functions of these components are known in the art, and are not repeated here.

The third programmable gate array 230 may include a signal scaling-up subunit 231 and a signal conversion subunit 232. The first programmable gate array 210 may communicates with the third programmable gate array 230 through a serial port, the second programmable gate array 220 may also communicates with the third programmable gate array 230 through a serial port, the serial port can be a Vbyone Rx 16Lane serial port. The third programmable gate array 230 can also be provided with a register.

The fourth programmable gate array 240 may include the signal enhancement unit 241, the mode adjustment module 242, the backlight adjustment module 243 and the scanning signal generation module 244. The fourth programmable gate array 240 may communicates with the third programmable gate array 230 through a serial port, the serial port can be a Vbyone Rx 32Lane serial port. The fourth programmable gate array 240 can also be provided with a register, a memory controller and a DDR3.

In the above embodiment including four programmable gate arrays, the registers in each programmable gate array can be used as the excitation module.

Figure 13:
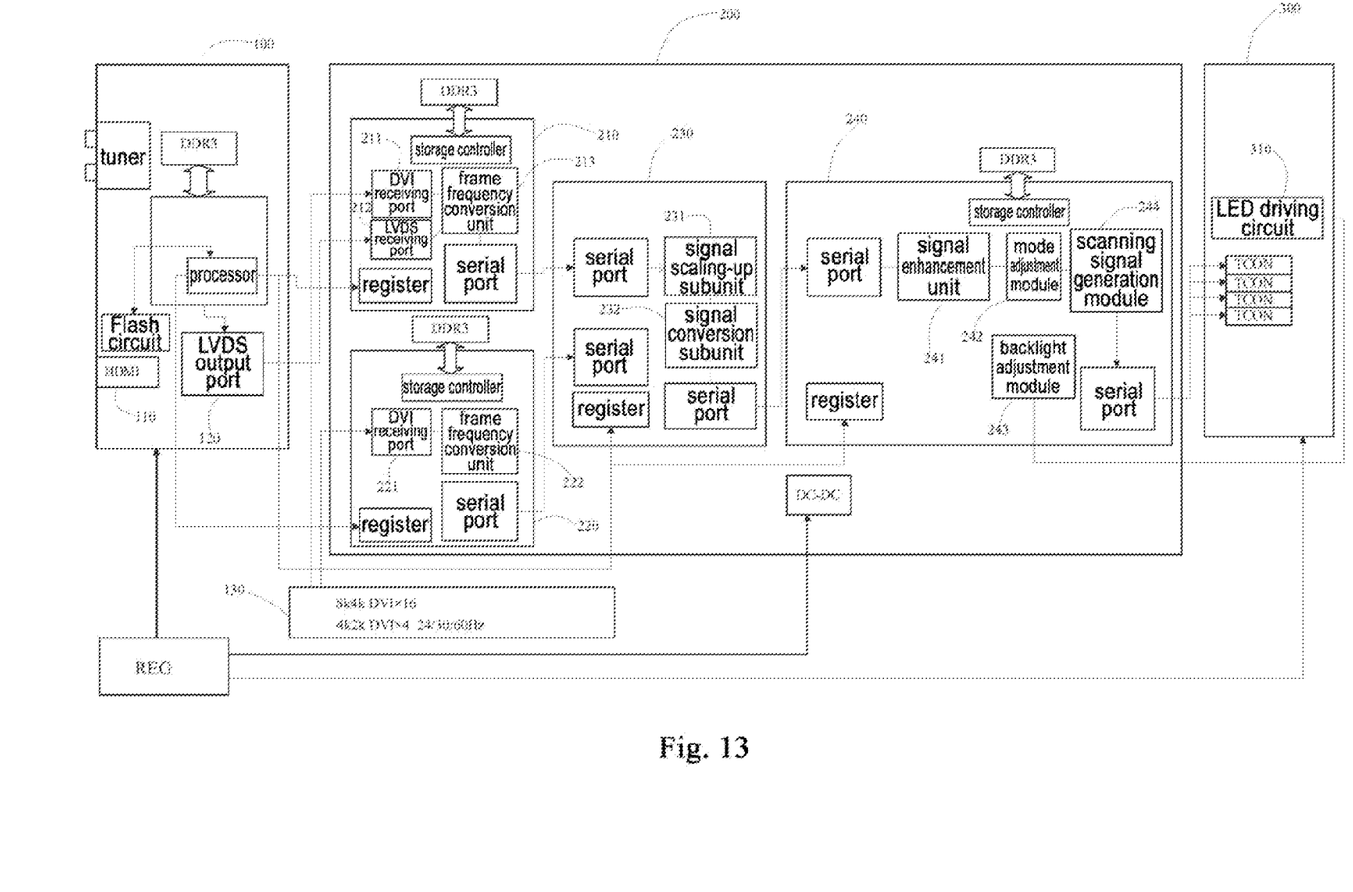
FIG. 13 is a schematic view of the display device according to the present invention.

As a further aspect of the present invention, there is provided a display device, the display device includes a signal input device 100, a signal processing system 200 and a display panel 300, wherein the signal processing system 200 is the above signal processing system of the present invention, and the signal input device 100 is used for providing the original image to the signal processing system.

The signal input device 100 may be a system-on-chip of a digital television (DTV SOC), or may be other video (or image) provision equipments. As shown in FIG. 13, the system-on-chip of the digital television may include an HDMI (High Definition Multimedia Interface) 110. An original video signal including an original image is received through the HDMI 110.

In the original video signal, the pixel resolution of the original image may be 1920×1080, and therefore the signal input device may include a LVDS output port 120. In the original video signal, the pixel resolution of the original image may be 3840×2160 or 7860×4320, and therefore the signal input device may further include a DVI output port 130 for outputting the original image divided in various forms.

The LVDS output port 120 is connected with the LVDS receiving port, and the DVI output port 130 is connected with two DVI receiving ports respectively. Preferably, the pixel resolution of the display panel is 7680×4320.

The original video signal provided by the signal input device comprises a plurality of frames of original image.

Figure 3:
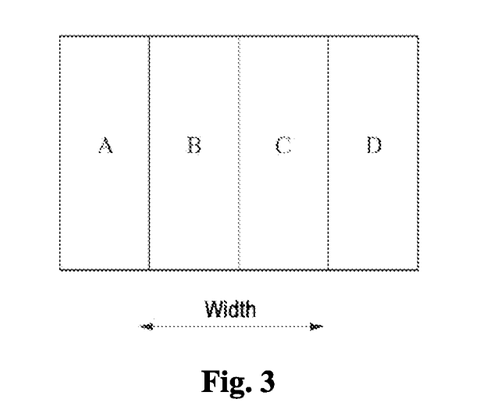
FIG. 3 is a schematic view of one division manner of the original image having a pixel resolution of 4k2k.
Figure 4:
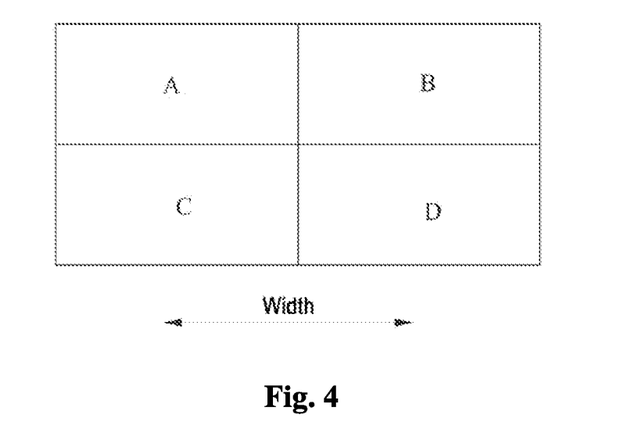
FIG. 4 is a schematic view of another division manner of the original image having a pixel resolution of 4k2k.

When the pixel resolution of each frame of original image in the original video signal is 3840×2160, each frame of the original image is divided into four parts by the signal input device and is sent to the signal processing system. Moreover, the signal input device may divide the original image into four parts in two different ways. The first way is to divide the original image into four sub-images, i.e. a sub-image A, a sub-image B, a sub-image C and a sub-image D along the width direction of the original image, as shown in FIG. 3, wherein the pixel resolution of each sub-image is 960×2160. The second way is shown in FIG. 4, the original image is divided into a total of four sub-images arranged in two rows and two columns, including a sub-image A and a sub-image B in the first row, a sub-image C and a sub-image D in the second row, wherein the pixel resolution of each sub-image is 1920×1080.

Figure 2:
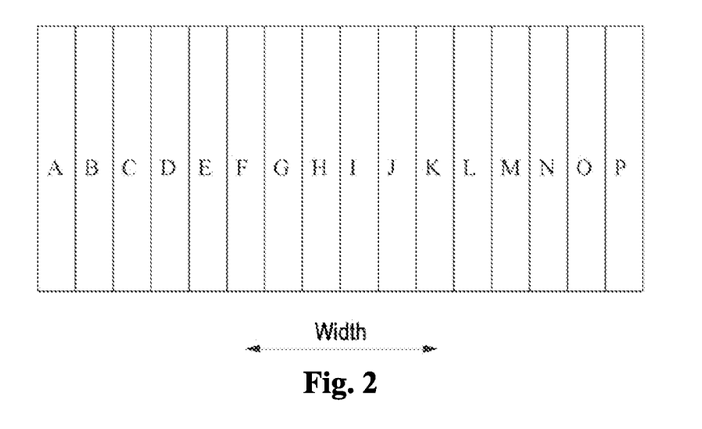
FIG. 2 is a schematic view of one division manner of the original image having a pixel resolution of 8k4k.
Figure 5:
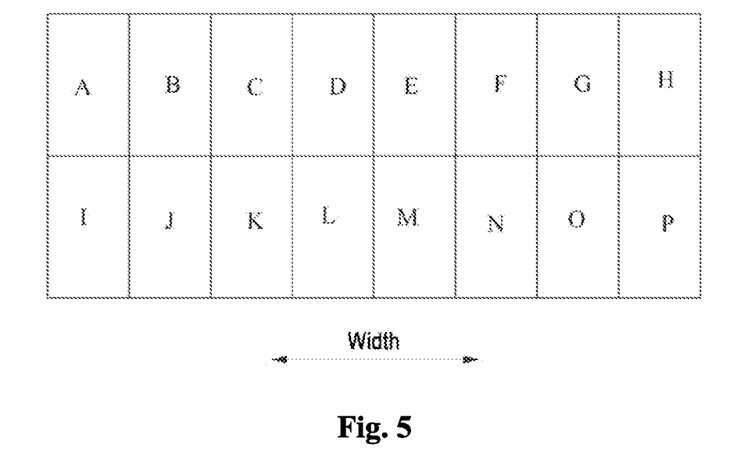
FIG. 5 is a schematic view of another division manner of the original image having a pixel resolution of 8k4k.
Figure 6:
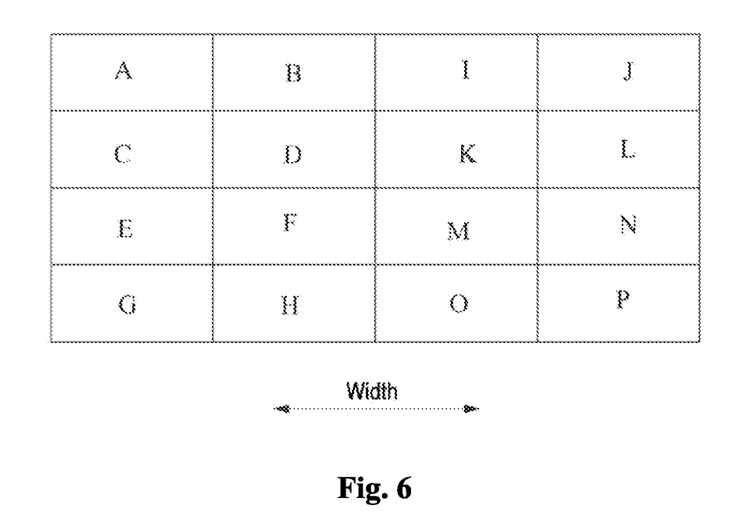
FIG. 6 is a schematic view of still another division manner of the original image having a pixel resolution of 8k4k.

When the pixel resolution of each frame of original image in the original video signal is 7680×4320, each frame of the original image is divided into 16 parts by the signal input device and is sent to the signal processing system. In this case, the signal input device may divide the original image into 16 parts, for example, in three different ways as follows. The first way is to divide the original image into a total of 16 sub-images arranged in two rows and eight columns, including a sub-image A, a sub-image B, a sub-image C, a sub-image D, a sub-image E, a sub-image F, a sub-image G, a sub-image H, a sub-image I, a sub-image J, a sub-image K, a sub-image L, a sub-image M, a sub-image N, a sub-image O, and a sub-image P, each sub-image has a pixel resolution of 960×2160, as shown in FIG. 5. The second way is to divide the original image into 16 sub-images (a sub-image A to a sub-image P) in four rows and four columns, each sub-image has a pixel resolution of 1920×1080, as shown in FIG. 6. The third way is to divide the original image into 16 sub-images (a sub-image A to a sub-image P) along the width direction of the original image, each sub-image has a pixel resolution of 480×4320, as shown in FIG. 2.

As shown in FIG. 13, the signal input device 100 may also include a processor, a flash circuit for storing control information of the processor, a tuner, a DDR3, etc. The structures and functions of these components are well known in the art, and are not repeated here.

The processor issues instructions to control the operations of the signal input device 100 and the signal processing system 200. For example, the processor can be connected with registers in the first programmable gate array 210, the second programmable gate array 220, the third programmable gate array 230 and the fourth programmable gate array 240. By providing control instructions from the processor to the registers in the first programmable gate array 210, the second programmable gate array 220, the third programmable gate array 230 and the fourth programmable gate array 240, the first programmable gate array 210, the second programmable gate array 220, the third programmable gate array 230 and the fourth programmable gate array 240 can be controlled to realize the respective functions.

The scanning signal generation module 244 is connected with the timers TCON of the display panel 300, so as to output the image signal of the final image to the display panel 300.

It should be understood that the above embodiments are merely illustrative embodiments to explain the principles of the present invention, the present invention is not limited thereto. Those skilled in the art are able to make various variations and modifications, without departing from the spirit and substance of the present invention, and such variations and modifications also drop within the scope of the present invention.

The invention claimed is:

1. A signal processing system comprising:
   an original image acquiring module for acquiring an image signal of an original image;
   a signal enhancement module for enhancing the image signal of the original image, so as to obtain an image signal of a final image having a pixel resolution no less than that of the original image, wherein
   the original image acquiring module includes a plurality of image receiving ports, and the plurality of image receiving ports are respectively configured for acquiring an original image with different pixel resolutions;
   the signal enhancement module comprises:
   a first signal converting unit for converting an image signal of the original image from an RGB signal into an intermediate YUV signal;
   a signal enhancement unit for performing an edge enhancement on a Y signal of the intermediate YUV signal, and adjusting any one of color levels, black and white levels, and hues of a U signal and a V signal of the intermediate YUV signal respectively, so as to obtain an enhanced intermediate YUV signal; and
   a second signal converting unit for converting the enhanced intermediate YUV signal into an intermediate RGB signal, so that the final image is displayed based on the intermediate RGB signal; wherein the first signal converting unit comprises:
   a signal converting subunit for converting the image signal of the original image from the RGB signal into a YUV signal of the original image; and
   a signal scaling-up subunit for scaling-up the YUV signal of the original image, so as to obtain the intermediate YUV signal.

2. The signal processing system according to claim 1, wherein the plurality of image receiving ports include a LVDS receiving port and two DVI receiving ports, the LVDS receiving port is configured for acquiring an original image with a pixel resolution of 1920×1080, the two DVI receiving ports are configured for acquiring respectively an original image with a pixel resolution of 3840×2160 and an original image with a pixel resolution of 7680×4320.

3. The signal processing system according to claim 1, wherein the signal enhancement unit is further configured for performing a brightness level adjustment and/or a gamma adjustment on the intermediate RGB signal, so as to obtain an RGB signal of the final image.

4. The signal processing system according to claim 1, wherein the signal converting subunit is configured for dividing the original image into n sub-images uniformly, and converting the image signals of the n sub-images from the RGB signals into YUV signals; the signal scaling-up subunit is configured for scaling-up the YUV signal of each sub-image to obtain an intermediate YUV signal corresponding to each of the scaled-up sub-images, each intermediate YUV signal corresponds to a sub-image having a same pixel resolution, and the final image with a pixel resolution of M×N is formed by combination of the n sub-images.

5. The signal processing system according to claim 4, wherein n is 16, M is 7680, and N is 4320.

6. The signal processing system according to claim 1, wherein the signal enhancement module further comprises:
   a frame frequency converting unit for converting an output frequency of the original image into 60 Hz.

7. The signal processing system according to claim 1, wherein the signal processing system further comprises a scanning signal generation module for converting the image signal of the final image into an image signal having a scanning order.

8. The signal processing system according to claim 1, wherein the signal processing system further comprises an excitation signal acquiring module for receiving an excitation signal, the image acquiring module start acquiring the original image when the excitation signal is acquired by the excitation signal acquiring module.

9. A display device comprising a signal input device, a signal processing system and a display panel, wherein the signal processing system is the signal processing system according to claim 1, and the signal input device is used for providing the original image to the signal processing system.

* * * * *